UNITED STATES PATENT OFFICE.

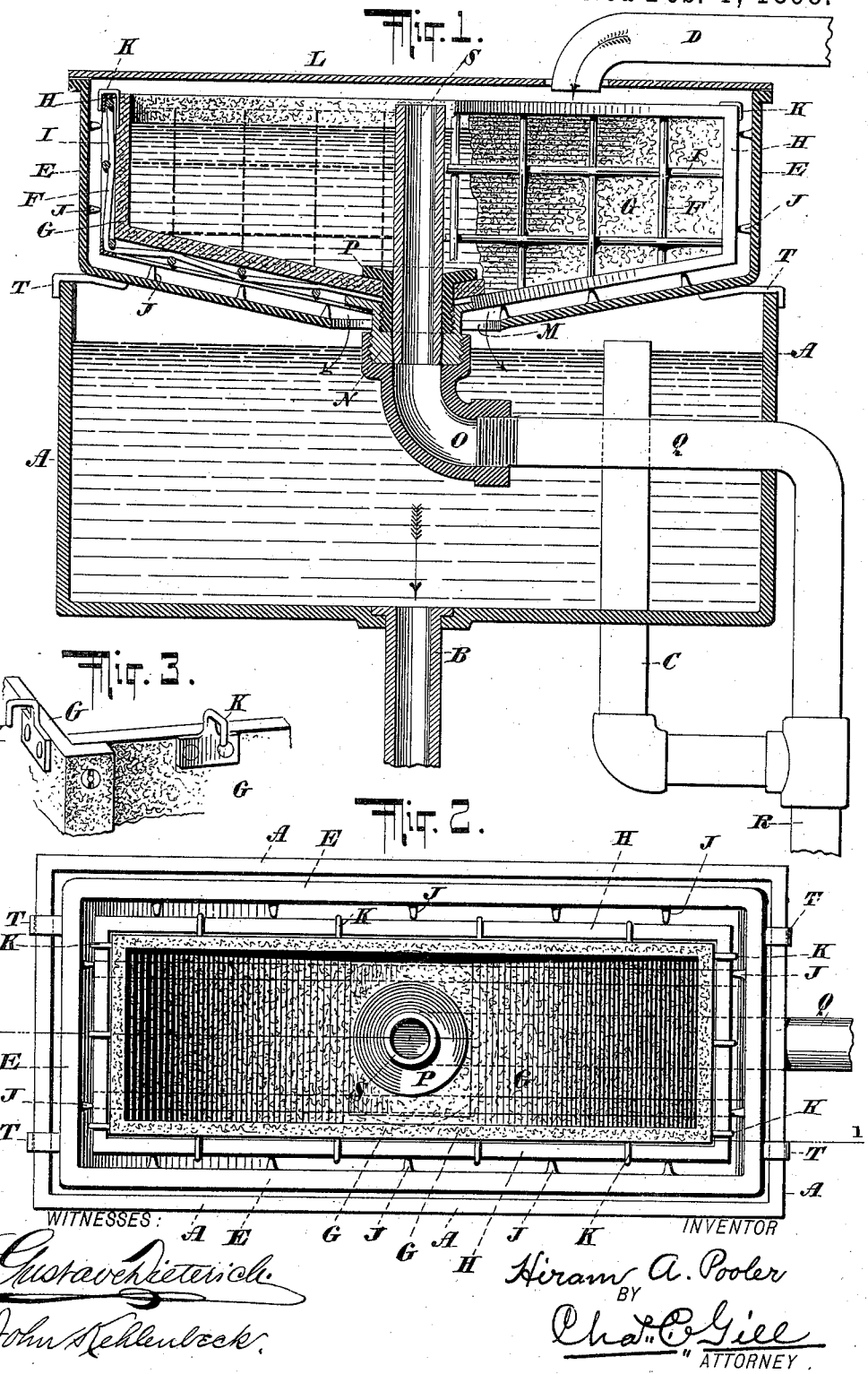

HIRAM A. POOLER, OF NEW YORK, N. Y.

FILTER.

SPECIFICATION forming part of Letters Patent No. 598,391, dated February 1, 1898.

Application filed August 10, 1897. Serial No. 647,681. (No model.)

*To all whom it may concern:*

Be it known that I, HIRAM A. POOLER, a citizen of the United States, residing at New York, in the county of New York and State of New York, have invented certain new and useful Improvements in Filters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to improvements in filters; and it consists in the novel filtering apparatus hereinafter described and claimed, adapted to receive the water from the source of supply and filter the same prior to its entrance into the tank or receptacle from which it passes to the consumer or into the distributing-pipes leading to the various rooms of a building.

My filter is especially adapted for use in connection with the customary tanks located on the top or in the upper portion of tall buildings, and from which tanks the tenants are supplied with water by means of distributing-pipes leading from the tanks to the various apartments in the building. It is well understood that in many locations these tanks are a necessity, owing to insufficient water-pressure in the mains, and that "tank-water," so called, is impure and a constant menace to the health of those persons who of necessity consume it.

My invention has for its primary object the rendering of tank-water pure and wholesome, and in carrying out my invention I provide a novel apparatus which will effectually purify the water before its entrance to the tank, so that no unfiltered water shall ever enter the tank.

The apparatus embodying my invention is adapted for effectual use in direct combination with the tank; it presents an extended area of filtering-surface whereby it is rendered practically available for filtering large quantities of water within the requisite limitations of time; it is protected by an exterior casing; its filtering-surface may be conveniently cleansed as frequently as necessary by scrubbing it with an ordinary scrubbing-brush, and it is of comparatively inexpensive construction.

The invention will be readily understood from the detailed description hereinafter presented, reference being had to the accompanying drawings, in which—

Figure 1 is a vertical section through a water-tank having applied thereto a filter constructed in accordance with and embodying my invention, the section through the filter and tank being on the dotted line 1 1 of Fig. 2. Fig. 2 is a top view of same, the cover being omitted; and Fig. 3 is a detached perspective view of one corner portion of the filtering-felt.

In the drawings, A designates the usual water-tank, having a distributing-pipe B and an overflow-pipe C. The supply-pipe for unfiltered water is designated by the letter D, and heretofore has delivered directly into the tank A, but in accordance with my invention the said pipe D is arranged to deliver the water directly into the filter, which, as illustrated in Fig. 1, is superimposed directly over the tank A and receives its support therefrom.

The filter comprises an exterior protecting-casing E, an inner supporting open-work frame F, and a shell G, of felt, the latter conforming to the inner surfaces of and fitting tightly against the supporting-frame F. The frame F at its sides and bottom will be formed of wire of very coarse mesh, and said frame at its corner edges will be strengthened by angle-iron strips H, to which the wires I will be secured. The frame F is intended to support the felt throughout its entire surfaces and to permit a ready escape of the water to the tank A as said water percolates through the felt shell G.

The exterior casing E will preferably be of metal and conform in outline to the outline of the frame F, and said casing E along its sides, ends, and bottom will be formed or provided with the ribs or lugs J, which will center the frame F in position and at all times preserve a space between the exterior surfaces of said frame F and the interior surfaces of the casing E.

The filtering of the water is performed by the felt shell G, and this shell, as illustrated, is in the form of a receptacle of considerable proportions to receive the water and furnish an extended surface area for the filtering of the water. The felt shell G will preferably be formed in one piece from a flat strip of material, the corner portions being cut out in order that the sides and ends of the shell may be turned upward and brought together in the manner illustrated in Fig. 3. The invention is not, however, limited to the making of the shell G in one piece of material, since it may readily be formed in several pieces, if found more convenient or economical. The shell G, while being supported throughout within the frame F, is provided along its upper edges with the hooks K, adapted to pass upon the upper edges of the frame F, and thereby retain the upper edges of the shell against the upper edges of the said frame and prevent any collapsing of the sides of the felt shell. The hooks K aid in supporting the shell G and furnish means by which the said shell may be readily lifted upward, when desired, from the frame F. Upon the top of the casing E will be provided a suitable cover L, and through this cover the discharge end of the supply-pipe D will pass.

The lower surfaces of the shell G, supporting-frame F and exterior casing E, taper downward to a central point over the tank A, and at said point the casing E is provided with the discharge-opening M, through which the filtered water may readily pass to the tank A. Upon the lower central portion of the bottom of the frame F is secured the nozzle N, which, as illustrated more clearly in Fig. 1, extends downward and is formed with an exterior thread to receive the elbow O and with an interior thread to receive the thimble P. The nozzle N receives, as above described, the elbow O, and the latter at its lower end receives the branch pipe Q, which is in direct connection with the main discharge-pipe R for unfiltered water, the pipe R being practically a waste-outlet pipe. The flange of the nozzle N is secured against the lower central portion of the supporting-frame F, and the thimble P at its flange clamps the inner lower edges of the felt shell G against the said frame F, as illustrated in Fig. 1, the edges of the felt shell G surrounding its lower central opening thus being securely clamped downward against the frame F and the flange of the nozzle N. The nozzle N receives the lower end of the overflow-pipe S, located within the felt shell G, said pipe S being removable and being securely held within the nozzle N by the tapering lower edges of said pipe, which are seated against correspondingly-tapered surfaces of the nozzle N.

When the filter is in use for filtering water, the pipe S will remain in the position in which it is illustrated in Fig. 1, in which position it serves merely as an overflow-pipe. When, however, it is desired to wash the felt shell G, the pipe S will be withdrawn upward, and at such time the water within the shell G will find a ready escape through the nozzle N, elbow O, and pipe Q. The cleansing of the felt shell G may be performed while said shell is within the frame F or upon the removal of said shell from said frame. It will be found entirely convenient, however, to leave the shell within the frame F and, the pipe S having been withdrawn, to thoroughly scrub the inner surfaces of said shell by means of an ordinary scrubbing-brush, the impure water and foreign matter finding their escape through the nozzle N and its connections to the waste-outlet pipe R. The shell G may be readily removed from the frame F at any time by withdrawing the pipe S and unscrewing the thimble P. Upon the removal of the thimble P the shell G becomes unattached to the frame F and may be lifted from the latter without difficulty.

The casing E will be supported within or over the tank A by any suitable means, and in the present instance I provide the hook-shaped bars T, secured at one end to said casing and at their other ends simply fitting upon the upper edges of the tank A.

In Fig. 1 I illustrate the apparatus in the operation of filtering water, and it will be observed from said figure that the supply-pipe D delivers the water within the felt shell G and that the water will percolate through the said shell and pass within the casing E, whence it will flow downward and escape through the opening M into the tank A. Thus the tank A receives the filtered water, and the construction is such that unfiltered water cannot enter the said tank. The entire inner surfaces of the shell G are exposed to the water to be filtered, and hence it will be apparent that a very extended area of filtering-surface is secured and that the water may be filtered in large quantities and with the requisite rapidity for practical use. When the filter has become foul or requires attention, the pipe S will be withdrawn and the inner surfaces of the shell G will be thoroughly scrubbed, the impurities and waste water finding their outlet through the elbow O and pipe Q to the main discharge-pipe R for overflow or waste water. The construction is such that the shell G may be very conveniently cleansed daily, if required, and hence at all times filtered water in the greatest state of purity may be obtained from the tank A and for the use of the tenants in the building compelled to use tank-water.

The felt shell G will preferably be about three-eighths of an inch in thickness and composed of fine lamb's-wool and cotton threads, enough of the latter only being employed to hold the lamb's-wool together and afford sufficient stability to the shell. It is my purpose to use as large a proportion of the lamb's-wool as possible in the formation of the felt shell G, since the lamb's-wool is a most perfect filtering substance and will arrest all impurities from the water passing through the same. The filtering of the water by the shell G is a mechanical process, no chemicals being introduced either into the water or embodied in said shell.

In the present instance the casing E, frame F, and shell G are of rectangular form, and, when viewed from above, in the outline of an oblong, but I do not limit the invention to any special configuration of the parts named, since it is my purpose to cause said parts to conform in their general outlines with the tank in connection with which the filter may be used. In the present instance the tank A is of rectangular outline and when viewed from above is in the form of an oblong, and hence the casing E, frame F, and shell G have been given the special outline illustrated. If the tank A were circular in outline, the filter would be given a corresponding outline.

The frame supporting the shell of felt and, if desired, all the other metal parts with which the filtered water may come in contact may be constructed of aluminium, or, if preferred, said metal parts may be treated by any of the known processes to render the same non-corrosive.

What I claim as my invention, and desire to secure by Letters Patent, is—

1. In a filter, the shell of felt in the form of a water-receiving receptacle through the walls of which the water passes and which has an inclined bottom leading to a waste-outlet, a frame maintaining said shell, and a receptacle receiving the water which issues through said walls; substantially as set forth.

2. In a filter, the felt shell having the hooks along its upper edges, the open frame supporting said shell and receiving along its edges the said hooks, and the exterior casing receiving said frame but separated by a space therefrom, combined with the tank or receptacle to receive the water which passes through the walls of said shell; substantially as set forth.

3. In a filter, the shell through the walls of which the water passes and which has an inclined bottom leading to a waste-outlet, the nozzle at said outlet and connected with a discharge-pipe for waste water, and the removable overflow-pipe connected with said nozzle and which when withdrawn leaves said nozzle in condition to discharge the contents of said shell, combined with the receptacle to receive the filtered water; substantially as set forth.

4. In a filter, the shell through the walls of which the water passes, the frame supporting said shell, the nozzle at the base of said frame and shell and in communication with the waste-discharge pipe, the thimble engaging said nozzle and clamping the edges of said shell around said nozzle, and the removable overflow-pipe connecting with said nozzle; substantially as set forth.

5. In a filter, the shell of felt through the walls of which the water passes, the wire frame snugly but removably receiving said shell, the exterior casing receiving said frame and having the outlet for filtered water, the overflow-pipe for said shell, and the waste-outlet from said shell, combined with the receptacle receiving the filtered water and having the delivery-pipe therefor; substantially as set forth.

In testimony whereof I affix my signature in presence of two witnesses.

HIRAM A. POOLER.

Witnesses:
CHAS. C. GILL,
EDWIN T. COLLINS.